United States Patent
Maloum et al.

(10) Patent No.: US 12,249,920 B2
(45) Date of Patent: Mar. 11, 2025

(54) METHOD FOR CONTROLLING A DC-DC CONVERTER FOR A TWO-WAY ELECTRICAL STORAGE BATTERY CHARGER

(71) Applicant: RENAULT s.a.s., Boulogne-Billancourt (FR)

(72) Inventors: Abdelmalek Maloum, Chevilly Larue (FR); Miassa Taleb, Yvry sur seine (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 581 days.

(21) Appl. No.: 17/614,176

(22) PCT Filed: May 15, 2020

(86) PCT No.: PCT/EP2020/063639
§ 371 (c)(1),
(2) Date: Nov. 24, 2021

(87) PCT Pub. No.: WO2020/239476
PCT Pub. Date: Dec. 3, 2020

(65) Prior Publication Data
US 2022/0224237 A1    Jul. 14, 2022

(30) Foreign Application Priority Data

May 29, 2019   (FR) ...................................... 1905782

(51) Int. Cl.
*H01M 10/44*    (2006.01)
*B60L 53/30*    (2019.01)
(Continued)

(52) U.S. Cl.
CPC ......... *H02M 3/33584* (2013.01); *B60L 53/30* (2019.02); *H02J 7/007* (2013.01);
(Continued)

(58) Field of Classification Search
CPC ...... H02J 7/007; H02J 2207/20; H02M 3/015; H02M 3/01; H02M 3/33573; H02M 3/33584; B60L 53/30; B60L 2210/10
(Continued)

(56) References Cited

U.S. PATENT DOCUMENTS

2014/0198536 A1   7/2014  Fu et al.
2015/0263635 A1   9/2015  Fu et al.
(Continued)

OTHER PUBLICATIONS

International Search Report issued Aug. 18, 2020 in PCT/EP2020/063639 (submitting English translation only), citing documents AA-AE and AX therein, 2 pages.
(Continued)

*Primary Examiner* — Edward Tso
(74) *Attorney, Agent, or Firm* — Oblon, McClelland, Maier & Neustadt, L.L.P.

(57) ABSTRACT

A control method for controlling the frequency of the input voltage of a DC-DC converter of a bidirectional electrical charger, operating in discharge mode, includes: defining a set voltage value, calculating a control frequency value of the DC-DC converter, obtained by inverting the gain of the DC-DC converter, as a function of an output battery voltage, a set input power, and the set input voltage; finely adjusting the DC bus by increasing/decreasing the frequency, and applying the control frequency thus calculated to the converter.

8 Claims, 5 Drawing Sheets

(51) Int. Cl.
*H01M 10/46* (2006.01)
*H02J 7/00* (2006.01)
*H02M 3/00* (2006.01)
*H02M 3/335* (2006.01)

(52) U.S. Cl.
CPC ....... *H02M 3/015* (2021.05); *H02M 3/33573* (2021.05); *B60L 2210/10* (2013.01); *H02J 2207/20* (2020.01)

(58) Field of Classification Search
USPC .............................. 320/127, 128, 137, 140
See application file for complete search history.

(56) References Cited

U.S. PATENT DOCUMENTS

| 2017/0033701 | A1 | 2/2017 | Fu et al. |
| 2017/0080808 | A1 | 3/2017 | Bai et al. |
| 2017/0085106 | A1* | 3/2017 | Bai ................. H02M 3/33584 |
| 2019/0089260 | A1 | 3/2019 | Boysen |

OTHER PUBLICATIONS

Zhijian Fang, et al. "Energy Feedback Control of Light-Load Voltage Regulation for LLC Resonant Converter" IEEE Transactions on Power Electronics, Institute of Electrical and Electronics Engineers, USA, XP 011717896, vol. 34, No. 5, May 1, 2019, pp. 4807-4819.

\* cited by examiner

METHOD FOR CONTROLLING A DC-DC CONVERTER FOR A TWO-WAY ELECTRICAL STORAGE BATTERY CHARGER

The present invention relates to a DC-to-DC converter for a bidirectional charger for charging a battery of electrical accumulators and its control method.

A conventional charger for charging a battery of electrical accumulators is unidirectional in the sense that it only allows the electrical accumulators to be recharged from an external power supply network, this being commonly called the charging direction or else the forward direction.

Such a unidirectional charger for charging a battery of electrical accumulators generally comprises a power-factor correction stage, also known by its abbreviation PFC, and a DC-to-DC conversion stage, more generally called the DC-to-DC stage.

However, it is useful for chargers for charging accumulators to be able also to deliver the stored electricity to an external electricity network, as a current source, or to replace a network and operate as a voltage source to which loads are connected; these are then known as bidirectional chargers. The delivery of current by the battery of electrical accumulators to the external network is referred to as the discharging direction, or else the reverse direction.

In particular, bidirectional chargers are known such as the one from document FR3014260 A1, which describes a charger with a resonant DC-to-DC converter of the series LC circuit type. However, such a circuit does not allow the type of power conversion to be changed since its gain is always less than 1.

Also known is a bidirectional (or reversible) charger for high power density applications from the prior art as shown in FIG. 1, which implements a DC-to-DC converter of the full-bridge LLC resonant type.

A full-bridge LLC resonant converter 10 according to FIG. 1 comprises a full switching bridge 11 generating a squarewave current or signal exciting an LLC circuit 12, which is composed of a series capacitor Cr and two inductors, a series inductor Lr and an inductor Lm in parallel with the primary winding of a transformer 13. The LLC circuit 12 then produces a resonant sinusoidal current in the transformer 13 which is rectified by the bridge rectifier 14, and then transmitted to the battery 16, which is also shown in the figures as a voltage source 15.

The assembly formed by the LLC circuit 12 is referred to as the primary circuit or primary portion of the converter, and the bridge rectifier 14 is referred to as the secondary circuit or secondary portion of the converter. In forward-direction, or charging-direction, operation of a charger, current is sent from the primary to the secondary.

Generally, in reversible chargers known from the prior art, the regulating frequencies for the DC-to-DC converter, in charging mode and in discharging mode, are limited to between substantially 60 kHz and 200 KHz.

Now, in discharging mode, at high battery voltage Vbat and low power, regulating to the desired gain $V_{dc}/V_{bat}$, which is in general less than 0.9, causes the regulating frequency for the DC-to-DC converter to diverge toward switching frequencies that are higher than 200 kHz. This causes a large decrease in the yield of the charger in discharging mode.

Thus, there is a need for control that is suitable for allowing the DC-to-DC converter to be better regulated in discharging mode at high battery voltage and low power.

To this end, a method is proposed for controlling the frequency of the input voltage of a DC-to-DC converter of a bidirectional electrical charger that is connected to a battery, operating in battery-discharging mode with a duty cycle of 50%, comprising:
  a prior step of defining a setpoint input voltage value at the input of the converter, the inputs and outputs of the converter being defined with respect to the battery-charging mode,
  a step of calculating a control frequency value for said DC-to-DC converter, said value being obtained by inverting the gain of said DC-to-DC converter according to an output battery voltage, an input power setpoint and said setpoint input voltage; and
  a step of applying the control frequency thus calculated to said converter.

Thus, it is possible to control the DC-to-DC converter of a charger operating in discharging, or inverted, mode, that is suitable for ensuring relatively effective regulation at high battery voltage and low power. The control frequency is advantageously obtained by inverting the gain, that is to say by solving a third-order equation obtained by expressing the gain as a function of this control frequency. This allows the yield of the converter to be optimized.

Advantageously and non-limitingly, said DC-to-DC converter is of series LLC resonant type comprising, at input, a full switching bridge that is connected to an LLC resonant circuit that is itself connected to a transformer that is connected to the battery via an H-bridge, said resonant circuit comprising a series inductor, a switched inductor that is connected to the output terminals of said full switching bridge only in discharging mode, and a series capacitor; said control frequency value being dependent on said two inductors and on said series capacitor. Thus, the control frequency is calculated by approximating the operation of the DC-to-DC converter, allowing the calculations to be simplified and the method to be made faster.

Advantageously and non-limitingly, the step of applying the control frequency comprises:
  defining a frequency increment step;
  a step of initializing the control frequency at an initial control value corresponding to the control frequency thus calculated;
  defining a first threshold value and a second threshold value, the opposite value to the first threshold value and the opposite value to the second threshold value, the first threshold value being strictly greater than the second threshold value and said threshold values being strictly positive;
  a step of calculating an error value between a measured input voltage value and said setpoint input voltage; and
  a step of comparing said error value and said threshold values;
the method comprising a regulating step in which:
  when said error value is between the first threshold value and the opposite value to the first threshold value, and when said error is greater than the second threshold value or less than the opposite value to the second threshold value, the control frequency is incremented or decremented by the frequency increment step;
  when said error value is between the second threshold value and the opposite value to the second threshold value, the control frequency is maintained at its previous value,
  when said error value is greater than the first threshold value or when said error value is less than the opposite value to the first threshold value, the initial control value is applied as the control frequency.

Thus, the method comprises relatively simple, fast and robust frequency control, which compensates for the imprecision that is connected with parameter dispersions.

Advantageously and non-limitingly, the method further comprises feedback regulation of the control frequency. This allows more effective and precise regulation to be obtained.

Advantageously, as soon as the control frequency reaches a value approaching 200 kHz and the measured input voltage departs from the setpoint input voltage, a packet regulating mode is activated, consisting in applying a maximum frequency while at the same time stopping chopping at intervals in order to let the input voltage return to its setpoint. This allows the operating limits of the LLC DC-to-DC converter in reversible mode to be overcome.

The invention also relates to a bidirectional charger for charging electrical accumulators, comprising a power-factor correction stage, at least one DC-to-DC converter and a device for implementing a method as described previously.

The invention also relates to a motor vehicle comprising a bidirectional charger for charging electrical accumulators as described previously.

Other features and advantages will become apparent from reading the description, given by way of indicative but non-limiting example, with reference to the following appended drawings:

FIG. 3b is a simplified schematic representation of the charger of FIG. 3a;

Figure 3A:
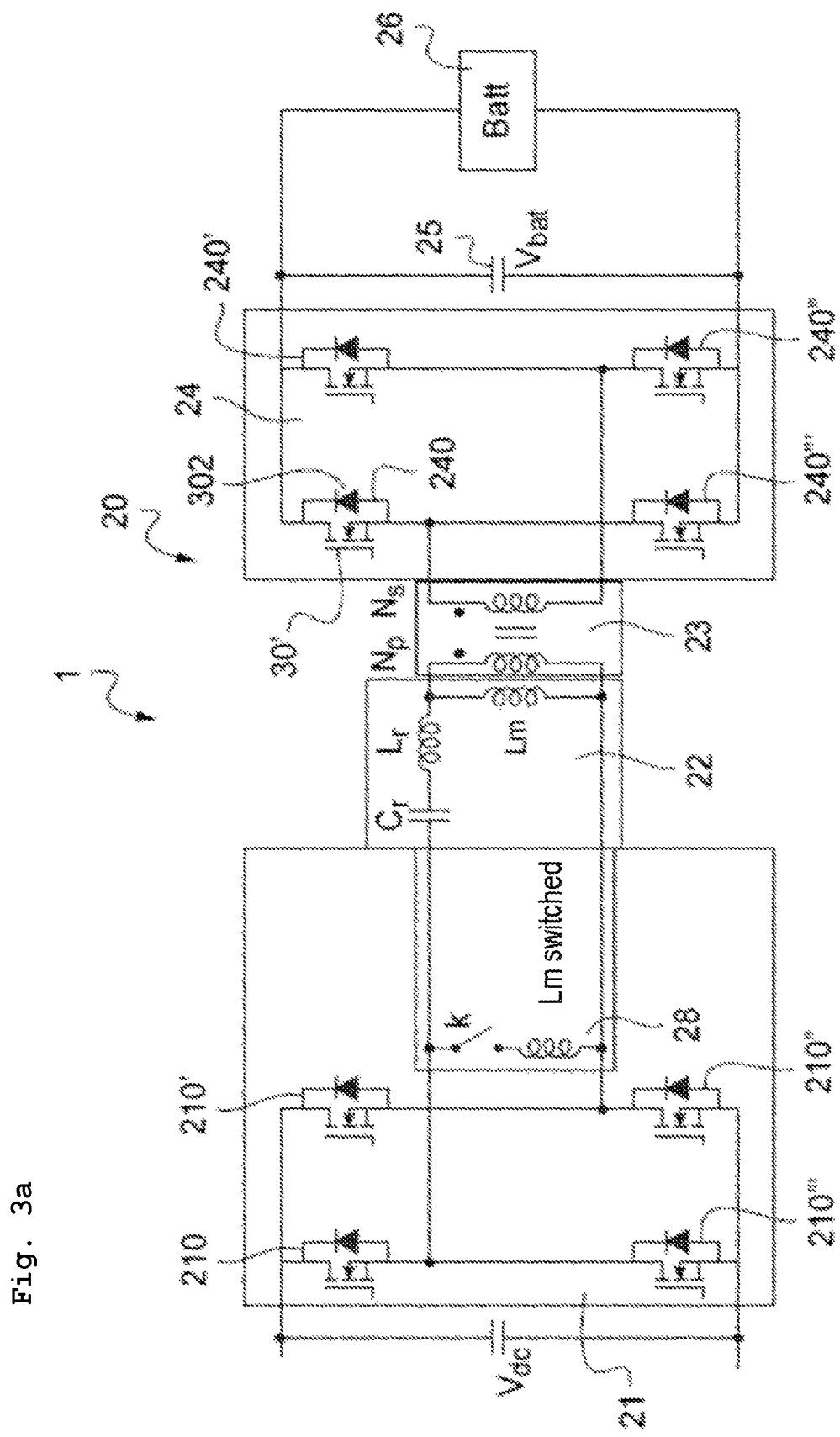
FIG. 3a is a schematic view of a bidirectional charger for charging electrical accumulators according to one embodiment of the invention.

With reference to FIG. 3a, according to one embodiment of the invention, a charger, not shown in its entirety, comprises a single-phase or multiphase power-factor correction rectifying input stage, referred to as PFC and not shown, and a DC-to-DC conversion device 1 comprising a bidirectional full-bridge LLC resonant converter 20. It should be noted that the elements of the charger are described with reference to the charging mode. Thus, the input of the DC-to-DC converter corresponds to the connections of the converter opposite the connections of the battery Batt. Likewise, the secondary of the transformer of the converter belongs to the output stage comprising the battery Batt.

The full-bridge LLC resonant converter 20 comprises a full switching bridge 21 generating a squarewave voltage or signal exciting an LLC circuit 22 that is composed of a capacitor and two inductors. The LLC circuit 22 then produces a resonant sinusoidal current that is transmitted by a transformer 23 and rectified by a bridge rectifier 24. The rectified and amplified current/signal is collected by the battery 26, the battery 25 also being shown as a voltage source 25.

The assembly that is formed by the full switching bridge 21 and the LLC circuit 22 is referred to as the primary circuit or primary portion of the converter, and the assembly that is formed by the rectifier 24 is referred to as the secondary circuit or secondary portion of the converter.

In inverted mode, the impedance of the power-factor correction stage, the network or the loads that are connected at the input of the charger is lumped together as a load resistor $R_{load}$.

In bidirectional operation of the charger, when current is sent from the primary to the secondary of the converter 20, this is referred to as the forward operating direction of the converter 20, which allows the battery 26 to be recharged from an external electricity network that is connected to the primary. The charger is further configured to operate in the reverse direction, in which the power that is stored by the battery 26 passes from the secondary to the primary of the converter 20 in order to supply power to an external electricity network by operating as a current source, or to replace a network by operating as a voltage source.

The switching bridge 21 comprises 4 switching arms, each being formed from a parallel structure 210, 210', 210", 210''', in the sense that the structure comprises electronic components that are connected in parallel with one other.

Each parallel structure 210, 210', 210", 210''' comprises a diode and a transistor.

The parallel structures 210, 210', 210", 210''' are connected as a full bridge, in a configuration that is well known to a person skilled in the art.

Figure 1:
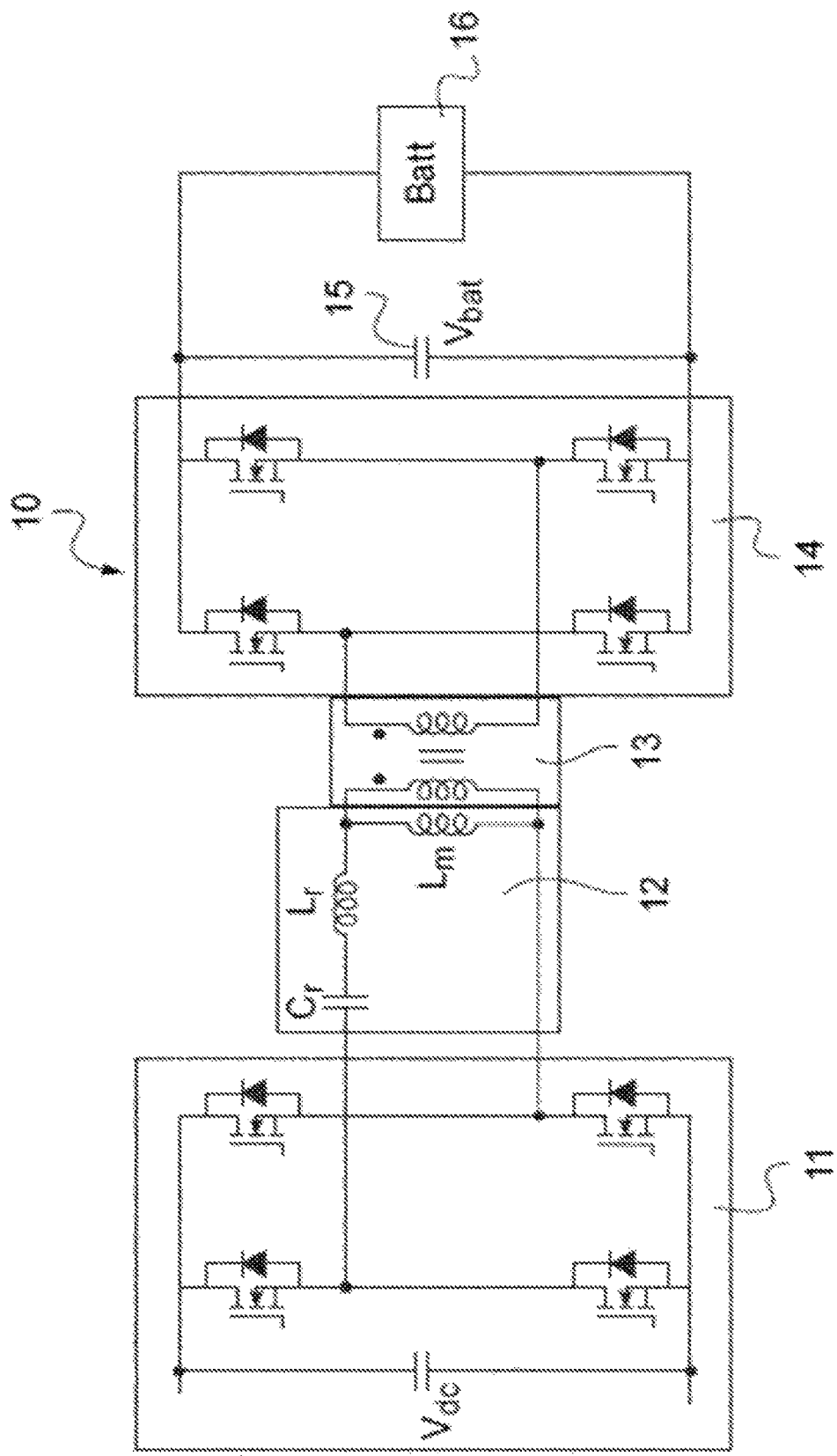
FIG. 1 is a schematic view of a charger for charging electrical accumulators that is known from the prior art.

The LLC circuit 22 and the transformer 23 are in accordance with those from the prior art that was cited previously with reference to FIG. 1.

The rectifier 24 of the secondary circuit comprises a full bridge that is formed from 4 switching arms.

Each switching arm is formed from a parallel structure 240, 240', 240", 240''', in the sense that the structure comprises electronic components that are connected in parallel with one another.

Each parallel structure 240, 240', 240", 240''' comprises, with reference to FIG. 3a, a diode 302 and a transistor 301, in a full-bridge rectifier circuit.

A parallel branch 28 connected in parallel with the LLC circuit 22 is added between the full switching bridge 21 and said LLC circuit 22. This branch 28 is connected to the two outputs of the switching bridge 21 upstream of the LLC circuit 22 (the term "upstream" referring here to the forward charging direction).

In other words, this parallel branch 28 extends to a first junction between an output of the switching bridge 21 and the capacitor Cr of the LLC circuit, while the other junction is connected between the second output of the switching bridge 21 and the second inductor Lm of the two inductors Lr and lm of the LLC circuit.

The parallel branch 28 comprises an inductor that is referred to as the switched inductor Lm_switched that is connected to the LLC circuit 22 in discharging mode, and disconnected in charging mode.

Thus, the DC-to-DC converter in discharging operating mode is equivalent to an LLC circuit.

The DC-to-DC conversion device 1 comprises a control means (not shown), for example a microprocessor and/or an FPGA, in order to control the switch k of the parallel branch 28 so as to open and close.

The control method 4 according to the invention aims to control the frequency of the voltage Vdc of the input capacitor.

The objective of this method is to implement a regulating mode for the DC bus, which is known by the name "burst" mode, by hysteresis on the frequency and DC bus is envisaged. This burst mode consists in applying the maximum frequency in packets and in shifting the frequency between 200 kHz and 0 Hz in order to be able to regulate the DC bus at the limit points.

This implies stopping chopping at intervals in order to let the DC bus (with a voltage Vdc in FIG. 3a) return to the setpoint.

Chopping then resumes in order to maintain it as far as possible. As soon as the DC bus exceeds a certain maximum threshold, which is defined by calibration, and as soon as the frequency is saturated, the control frequency is shifted to zero and chopping stops. These steps are implemented repeatedly.

Figure 2:
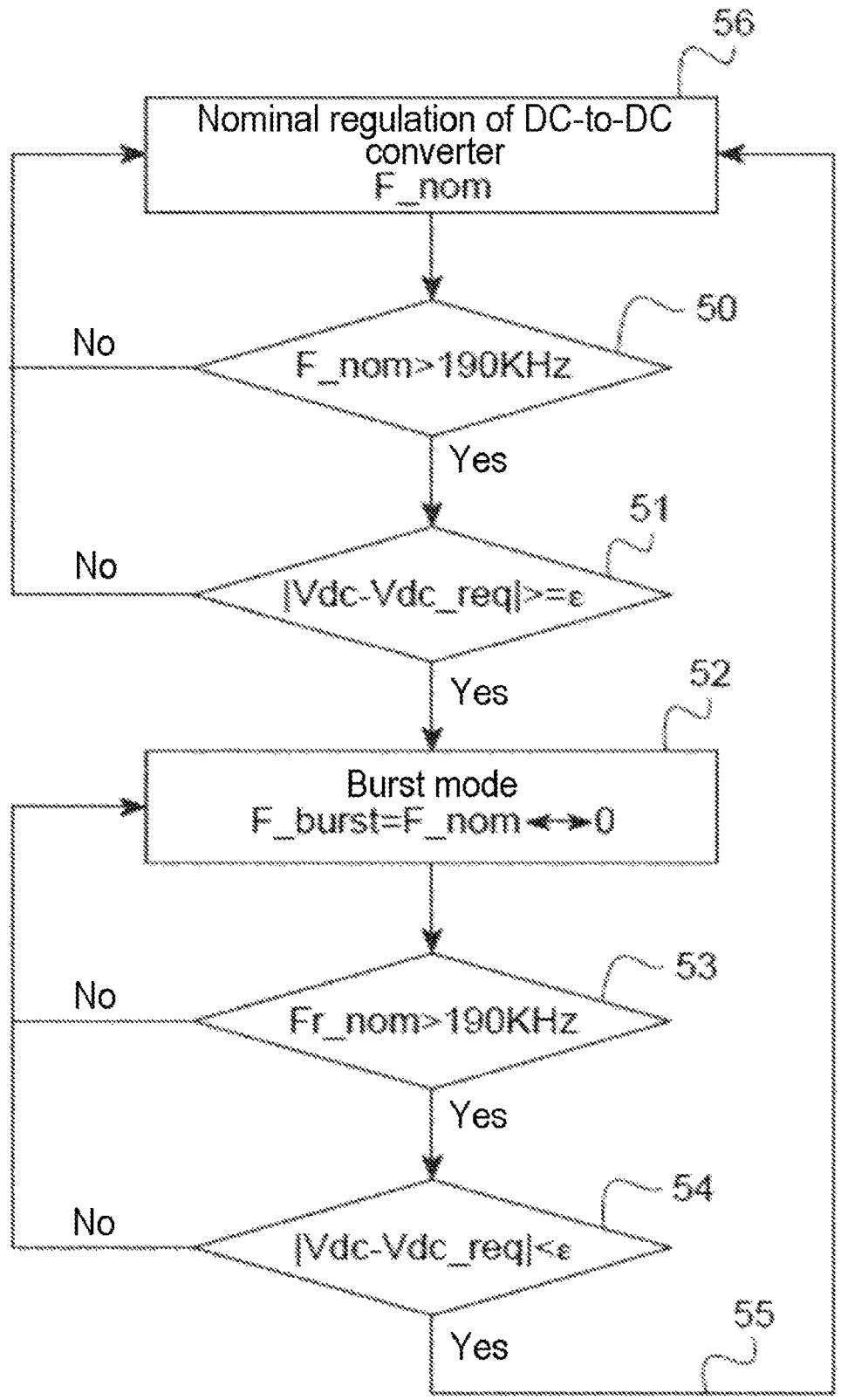
FIG. 2 is a schematic view of the control method alternating between the nominal regulating mode and the burst mode, according to one embodiment of the invention.

Thus, with reference to FIG. 2, the burst mode is explained for discharging, but operates on the same principle in charging operation, for operating points that are given as examples, here Vbat=400 V or Vbat=430 V with a setpoint of the voltage Vdc at $V_{dc}^{reg}$ that is equal to 450 V.

In FIG. 2, as soon as the frequency $F_{nom}$ reaches 50 a value that is greater than or equal to 190 kHz or, according to an alternative, any value approaching 200 kHz, and the DC bus departs 51 from the setpoint, the burst mode is activated 52, returning the DC bus to its setpoint, substantially 450 V.

When the power goes back up, leading the frequency $F_{nom}$ to no longer saturate 53 naturally, and the DC bus converges 54 once again toward the setpoint value, the burst mode is stopped 55 and the nominal regulation 56 applies the control frequency continuously.

To this end, the method according to the invention comprises calculating a chopping frequency of the DC-to-DC converter.

Figure 3B:
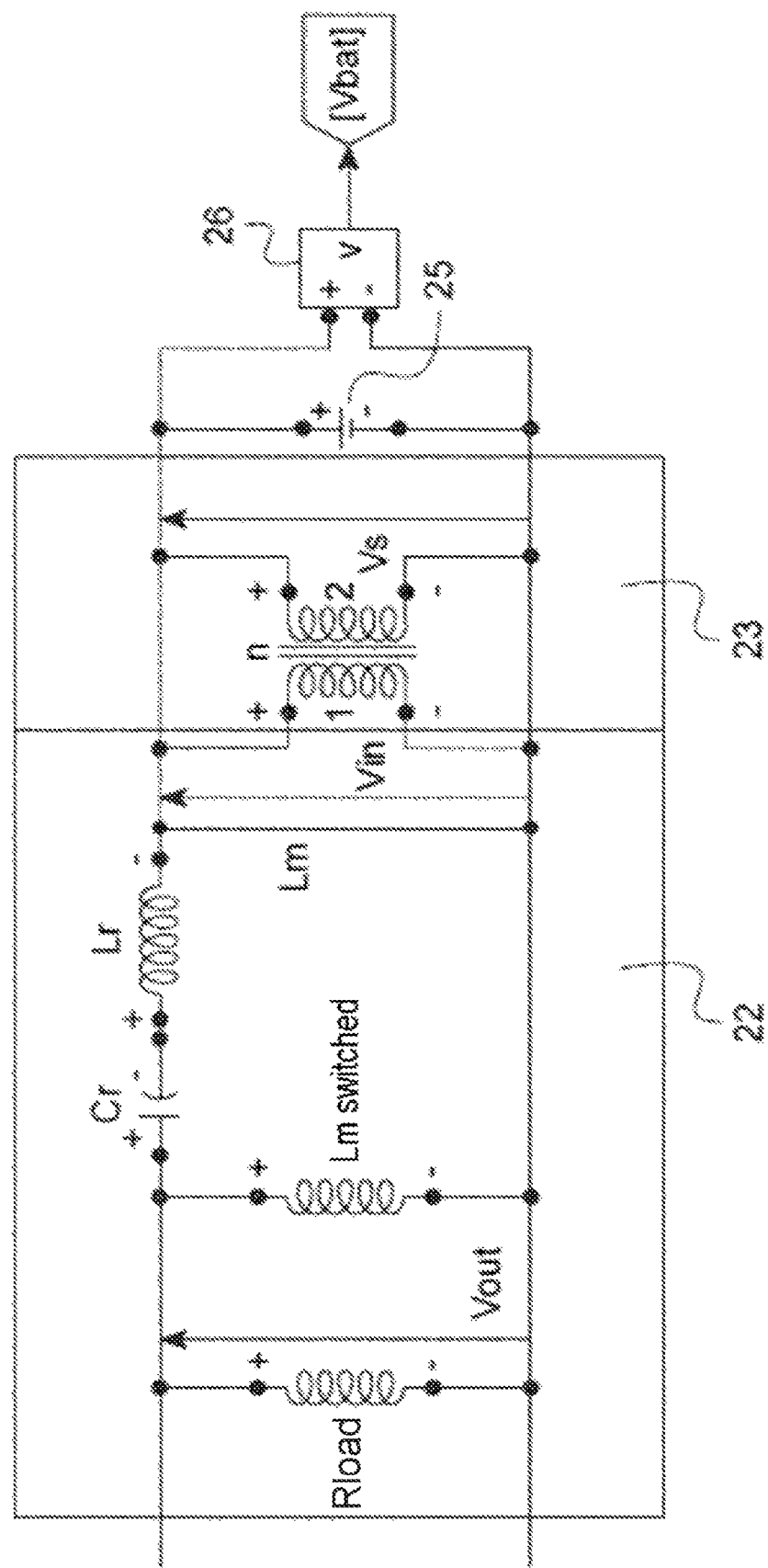

It is known, with reference to FIG. 3b, that the transfer function of an LLC DC-to-DC converter in discharging mode according to the invention is of the form:

$$G = \frac{V_{DC}}{\eta V_{bat}} = \frac{V_{out}}{V_{in}} \quad (1)$$

With G being the gain of the transfer function of the DC-to-DC converter (or at the very least of the inverter portion of the DC-to-DC converter up to the primary of the transformer);

η being the turns ratio of the transformer of the DC-to-DC converter;

$V_{bat}$ being the voltage across the terminals of the battery, or the voltage at the output of the DC-to-DC converter;

$V_{dc}$ being the DC voltage at the input of the DC-to-DC converter;

And, in accordance with generic terminology, in discharging operating mode: $V_{out}$ being the voltage at the output of the DC-to-DC converter in discharging mode, and $V_{in}$ being the voltage at the input of the DC-to-DC converter in discharging mode.

With reference to FIG. 3b, which is a simplified view of the DC-to-DC converter, the resistor $R_{load}$ corresponds to the impedance of the PFC and of the various loads or networks that are connected to the charger in reversible (discharging) mode. Thus, $R_{load}$ is calculated according to the following equation:

$$Rload = \frac{8}{\pi^2} \frac{V_{DC}^2}{P} \quad (2)$$

With P being the power at the primary of the transformer.

Thus, in order to calculate the gain of the transfer function of the DC-to-DC converter, $$G(s) = \left|\frac{V_{out}}{V_{in}}\right| = \left|\frac{V_{DC}}{\eta V_{bat}}\right| = \left|\frac{Rload\ L_m switched\ C_r s^2}{(L_{m\,switched} L_r C_r s^3 +} \atop {Rload\ C_r (L_{m\,switched} + L_r) s^2 +} \atop {L_{mswitched} s + Rload}\right| \quad (3)$$

is calculated.

This equation (3) is rewritten as a function of angular frequency (ω=2πf$_{sw}$), setting s=jω.

The gain equation may consequently be written according to the following equations:

$$G(s) = \left|\frac{V_{out}}{V_{in}}\right| = \left|\frac{V_{DC}}{\eta V_{bat}}\right| = \left|\frac{Rload\ L_m - switched\ C_r (jw)^2}{(L_{m\,switched} L_r C_r (jw)^3 +} \atop {Rload\ C_r (L_{m\,switched} + L_r) (jw)^2 +} \atop {L_{mswitched} (jw) + Rload}\right|$$

Or $$G(s) = \left|\frac{V_{out}}{V_{in}}\right| = \left|\frac{V_{DC}}{\eta V_{bat}}\right| = \left|\frac{Rload\ L_m switched\ C_r (j2\pi f_{sw})^2}{(L_{m\,switched} L_r C_r (j2\pi f_{sw})^3 +} \atop {Rloadload\ C_r (L_{m\,switched} + L_r)(j2\pi f_{sw})^2 +} \atop {L_{mswitched} (j2\pi f_{sw}) + Rload)}\right|$$

Calculating the gain G of the transfer, in order to obtain an expression for the control frequency $f_{sw}$ according to the equation:

$$f_{SW}(\omega) = fct(Vbat, Preq, Vdc(setpoint)) \quad (5)$$

With $V_{bat}$ being the battery voltage, $V_{dc}$ the voltage at the input of the DC-to-DC converter and $p^{req}$ a power setpoint at the input of the DC-to-DC converter.

Specifically, by replacing $V_{dc}$ in the expression for G(s) with a setpoint $V_{dc}$ value, the frequency for which the DC bus converges with a given voltage, for example 450 V, may be calculated.

The gain G is calculated as being the ratio of Vdc/ηVbat, or in this embodiment G=450 V/ηVbat.

It will be noted that the general expression for the gain G is the same for discharging, but the gain values are different, since the parameters are themselves different.

A 3rd-order equation that is dependent on (ω=2πf$_{sw}$) is deduced therefrom, $$\omega^3 + A\omega^2 + B\omega + C = 0 \quad (6)$$

With the parameters A, B and C being functions of $V_{bat}$ and $P^{REQ}$, $L_{m\_switched}$ and $L_r$ the inductance values of the inductors of the equivalent circuit of the DC-to-DC converter in FIG. 3b, and Cr the capacitance value of the equivalent circuit of the DC-to-DC converter in FIG. 3b. In other words, Cr and Lr correspond to the series capacitor and to the series inductor of the LLC circuit 22 of FIG. 3a.

Solving the equation (6) for ω allows the control frequency $f_{sw}(\omega)$ for the DC-to-DC converter to be calculated by feedforward control.

Because of parameter dispersions, calculation precision levels and simplifying assumptions that are made for writing the transfer function of the DC-to-DC converter, the application of this equation is not sufficient to eliminate the steady-state error between the measured DC voltage and the setpoint. However, the error remains insignificant and has a maximum of 30 V.

Figure 4:
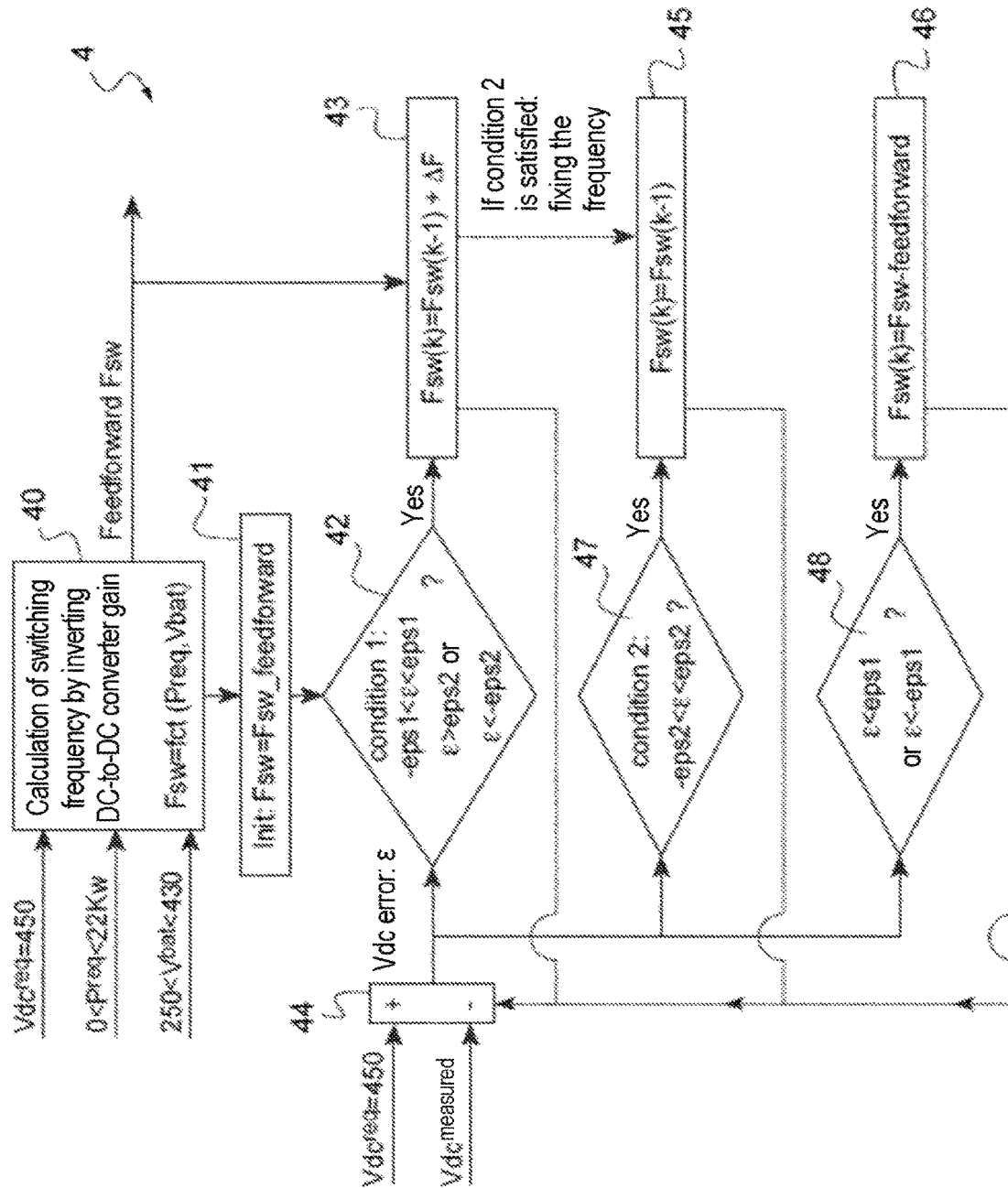
FIG. 4 is a flowchart of the regulating method according to the embodiment of FIG. 2.

In order to overcome this problem, with reference to FIG. 4, a controller has been added to the previous feedforward. It operates by incrementing or decrementing the frequency until the steady-state error is eliminated, and thus adjusts the initial frequency that is generated by the previous calculation a little more, for better precision.

The controller according to the first embodiment is a discrete controller in which:

eps1 is a threshold value from which the frequency incrementation/decrementation begins.

eps2 is a threshold value for which the control frequency is fixed.

Thus, according to an example embodiment with reference to FIG. 4, in a first step the control frequency $f_{sw}(\omega)$, also called the switching frequency $f_{sw}(\omega)$, is calculated 40, as described previously, according to a setpoint voltage $V_{DC}^{req}$, the battery voltage and the power.

The control frequency value $f_{sw}(k)$ is initialized 41 at the previously calculated initial frequency value $f_{sw\_feedforward}$.

Then, an error value & between the setpoint voltage $V_{DC}^{req}$ and the measured voltage $V_{dc}^{measured}$ at the input of the DC-to-DC converter is calculated 44.

This error value & is compared to two error threshold values eps1 and eps2, that are positive real numbers such that eps1>eps2.

If 42 the error & is between the adjustable limits of eps1 and −eps1, for example between 200 V and −200 V, and if, in addition, the error ε is greater than eps2 or less than −eps2, these thresholds being, for example, 5 V and −5 V, the initial frequency value $f_{sw\_feedforward}$ is incremented or decremented according to the position of the DC bus with respect to the setpoint 43, by incrementing by a frequency increment step ΔF, or:

$$f_{sw}(k) = f_{sw\_feedforward} +/- \Delta F \quad (7)$$

k being a time integer.

After this step 43, the method loops back to the step 44.

If 47 after the step 44 the error & is between the limits of eps2 and −eps2, the value of the frequency $f_{sw}(k)$ is fixed and maintained 45 which ensures a DC bus at 5 V that is close to the setpoint at the previous value, or:

$$f_{SW}(k) = f_{SW}(k - 1)$$

The value $f_{sw}(k-1)$ being equal to $f_{sw\_feedforward}$ if the condition 1 has not been verified previously, or to $f_{sw\_feedforward}+k*\Delta F$ if the step 45 takes place after k previous steps 43.

Lastly, if 48 the error & is greater than eps1 or less than −eps1, the frequency value $f_{sw}(k)$ that is calculated by feedforward in the step 40 is used 46.

This value is updated periodically. The control will continue to apply the frequency that is calculated by feedforward as long as no condition on the error is satisfied, the steps 43, 45 and 46 looping back to the step 44.

The invention is not limited to the values of the given example error threshold values eps1 and eps2. In particular, eps2 may be adjusted to 1 or 0 V, according to the feasibility of the operating point.

This method ensures convergence at a stable frequency, which is ensured by the feedforward action and is effective by virtue of the action of the controller, which finishes eliminating the steady-state error and makes the DC bus converge with the setpoint value with precision.

The invention is not limited to the type of controller described in the first example embodiment. A controller of the proportional-integral or proportional-integral-derivative type may also be provided, which a person skilled in the art knows how to implement, although adjusting them is more complex than the controller of the first embodiment of the invention.

The invention claimed is:

1. A method for controlling a frequency of an input voltage of a DC-to-DC converter of a bidirectional electrical charger that is connected to a battery, operating in battery-discharging mode with a duty cycle of 50%, said method comprising:
    defining a setpoint input voltage value at an input of the DC-to-DC converter, inputs and outputs of the DC-to-DC converter being defined with respect to a battery-charging mode;
    calculating a control frequency value for said DC-to-DC converter, said control frequency value being obtained by inverting a gain of said DC-to-DC converter, according to an output battery voltage, an input power setpoint, and said setpoint input voltage value; and
    applying the control frequency value to said DC-to-DC converter.

2. The method as claimed in claim 1, wherein said DC-to-DC converter is of a series LLC resonant type comprising, at the input, a full switching bridge that is connected to an LLC resonant circuit that is connected to a transformer that is connected to the battery via an H-bridge, said LLC resonant circuit comprising a series inductor, a switched inductor that is connected to output terminals of said full switching bridge only in a discharging mode, and a series capacitor, and
    wherein said control frequency value is dependent on said series inductor, said switched inductor, and said series capacitor.

3. The method as claimed in claim 1, wherein the applying the control frequency value comprises:
    defining a frequency increment step;
    initializing the control frequency value at an initial control value corresponding to the control frequency value that is calculated;
    defining a first threshold value and a second threshold value, an opposite value to the first threshold value and an opposite value to the second threshold value, the first threshold value being strictly greater than the second threshold value and said first and second threshold values being strictly positive;
    calculating an error value between a measured input voltage value and said setpoint input voltage value; and
    comparing said error value and said first threshold value, said second threshold value, the opposite value to the first threshold value, and the opposite value to the second threshold value;
wherein the method further comprises regulating in which:
    when said error value is between the first threshold value and the opposite value to the first threshold value, and when said error value is greater than the second threshold value or less than the opposite value to the second threshold value, the control frequency value is incremented or decremented by the frequency increment step;

when said error value is between the second threshold value and the opposite value to the second threshold value, the control frequency value is maintained at a previous value; and when said error value is greater than the first threshold value or when said error value is less than the opposite value to the first threshold value, the initial control value is applied as the control frequency value.

4. The method as claimed in claim 1, further comprising feedback regulation of the control frequency value.

5. The method as claimed in claim 1, wherein, as soon as the control frequency value reaches a value approaching 200 kHz and a measured input voltage departs from the setpoint input voltage value, a packet regulating mode is activated including applying a maximum frequency while at a same time stopping chopping at intervals in order to let the input voltage return to the setpoint input voltage value.

6. A bidirectional charger for charging electrical accumulators, comprising:
   a power-factor correction stage;
   at least one DC-to-DC converter; and
   a device configured to control a frequency of an input voltage of the at least one DC-to-DC converter of the bidirectional charger that is connected to a battery, operating in a battery-discharging mode with a duty cycle of 50%, the device being configured to
      define a setpoint input voltage value at an input of the at least one DC-to-DC converter, inputs and outputs of the at least one DC-to-DC converter being defined with respect to a battery-charging mode,
      calculate a control frequency value for the at least one DC-to-DC converter, the control frequency value being obtained by inverting a gain of the at least one DC-to-DC converter, according to an output battery voltage, an input power setpoint, and the setpoint input voltage value, and
      apply the control frequency value to the at least one DC-to-DC converter.

7. A motor vehicle comprising:
   the bidirectional charger for charging electrical accumulators as claimed in claim 6.

8. A device for controlling a frequency of an input voltage of a DC-to-DC converter of a bidirectional electrical charger that is connected to a battery, operating in battery-discharging mode with a duty cycle of 50%, the device comprising:
   circuitry configured to
      define a setpoint input voltage value at an input of a DC-to-DC converter, inputs and outputs of the DC-to-DC converter being defined with respect to a battery-charging mode,
      calculate a control frequency value for the DC-to-DC converter, the control frequency value being obtained by inverting a gain of the DC-to-DC converter, according to an output battery voltage, an input power setpoint, and the setpoint input voltage value, and
      apply the control frequency value to the DC-to-DC converter.

\* \* \* \* \*